(12) United States Patent
Eppert et al.

(10) Patent No.: US 7,753,450 B2
(45) Date of Patent: Jul. 13, 2010

(54) FITTING FOR A VEHICLE SEAT

(75) Inventors: Dietmar Eppert, Remscheid (DE);
Holger Finner, Hückeswagen (DE);
Ulrich Lehmann, Alfter (DE); Grit Scholz, Remscheid (DE); Andreas Vedder, Haan (DE); Gregor Vossmann, Vreden (DE); Heinrich Busch, Remscheid (DE)

(73) Assignee: KEIPER GmbH & Co. KG, Kaiserlautern (DE)

( * ) Notice: Subject to any disclaimer, the term of this patent is extended or adjusted under 35 U.S.C. 154(b) by 0 days.

(21) Appl. No.: 12/150,483

(22) Filed: Apr. 29, 2008

(65) Prior Publication Data
US 2008/0203784 A1 Aug. 28, 2008

Related U.S. Application Data

(63) Continuation of application No. PCT/EP2007/001485, filed on Feb. 21, 2007.

(30) Foreign Application Priority Data

Apr. 4, 2006 (DE) ........................ 10 2006 015 559

(51) Int. Cl.
*B60N 2/02* (2006.01)
*B60N 2/22* (2006.01)
(52) U.S. Cl. ..................... 297/362; 297/361.1
(58) Field of Classification Search ................. 297/362, 297/361.1; 475/162, 163, 164, 175
See application file for complete search history.

(56) References Cited

U.S. PATENT DOCUMENTS

| 4,713,986 A | 12/1987 | Cremer et al. |
| 5,634,689 A | 6/1997 | Putsch et al. |
| 5,755,491 A | 5/1998 | Baloche et al. |
| 6,164,723 A | 12/2000 | Ganot |

(Continued)

FOREIGN PATENT DOCUMENTS

DE 35 29 887 A1 3/1987

(Continued)

OTHER PUBLICATIONS

U.S. Appl. No. 12/077,558; filed: Mar. 20, 2008; In re: Christoph Peters et al., entitled "Fitting for a Vehicle Seat".

(Continued)

*Primary Examiner*—David Dunn
*Assistant Examiner*—Tania Abraham
(74) *Attorney, Agent, or Firm*—Womble Carlyle Sandridge & Rice, PLLC

(57) ABSTRACT

The present invention relates to a fitting (8) for a vehicle seat, especially for an automotive seat. The fitting comprises two individual fittings (10, 50) that are arranged axially juxtaposed and in parallel in relation to the flow of force, and that each have two fitting parts (11, 12, 51, 52) that can be rotated in relation to each other and that are mechanically interlinked by way of an eccentric epicyclic gear defining backlash. The present invention is characterized in that the first individual fitting (10) has an eccentric that is not able to eliminate the backlash and the second individual fitting (50) has an eccentric adapted for eliminating the backlash.

26 Claims, 3 Drawing Sheets

U.S. PATENT DOCUMENTS

| | | |
|---|---|---|
| 6,454,354 B1 | 9/2002 | Vossmann et al. |
| 6,619,743 B1 | 9/2003 | Scholz et al. |
| 7,497,519 B2 * | 3/2009 | Dill et al. .................... 297/362 |
| 2003/0214165 A1 | 11/2003 | Finner et al. |
| 2005/0127732 A1 | 6/2005 | Peters |
| 2006/0006717 A1 * | 1/2006 | Sakamoto ................ 297/361.1 |
| 2006/0170269 A1 * | 8/2006 | Oki ............................. 297/367 |
| 2008/0185892 A1 | 8/2008 | Peters et al. |
| 2009/0072605 A1 * | 3/2009 | Otto et al. ................ 297/361.1 |

FOREIGN PATENT DOCUMENTS

| | | |
|---|---|---|
| DE | 44 36 101 A1 | 6/1995 |
| DE | 195 27 374 A1 | 1/1997 |
| DE | 199 15 863 A1 | 10/1999 |
| DE | 199 04 300 C1 | 8/2000 |
| DE | 199 38 666 A1 | 2/2001 |
| DE | 102 53 054 A1 | 6/2004 |
| DE | 103 27 640 B3 | 12/2004 |
| DE | 10 2005 046 807 B3 | 11/2006 |
| WO | WO 00/44582 | 8/2000 |
| WO | WO 03/024740 A1 | 3/2003 |
| WO | WO 2007/039002 | 4/2007 |

OTHER PUBLICATIONS

US 6,648,413, Nov. 18, 2003, Uramichi, (withdrawn).
U.S. Application No. 12/286,915; filed: Oct. 3, 2008; In re: Dietmar Eppert et al., entitled "Fitting for a Vehicle Seat".

* cited by examiner

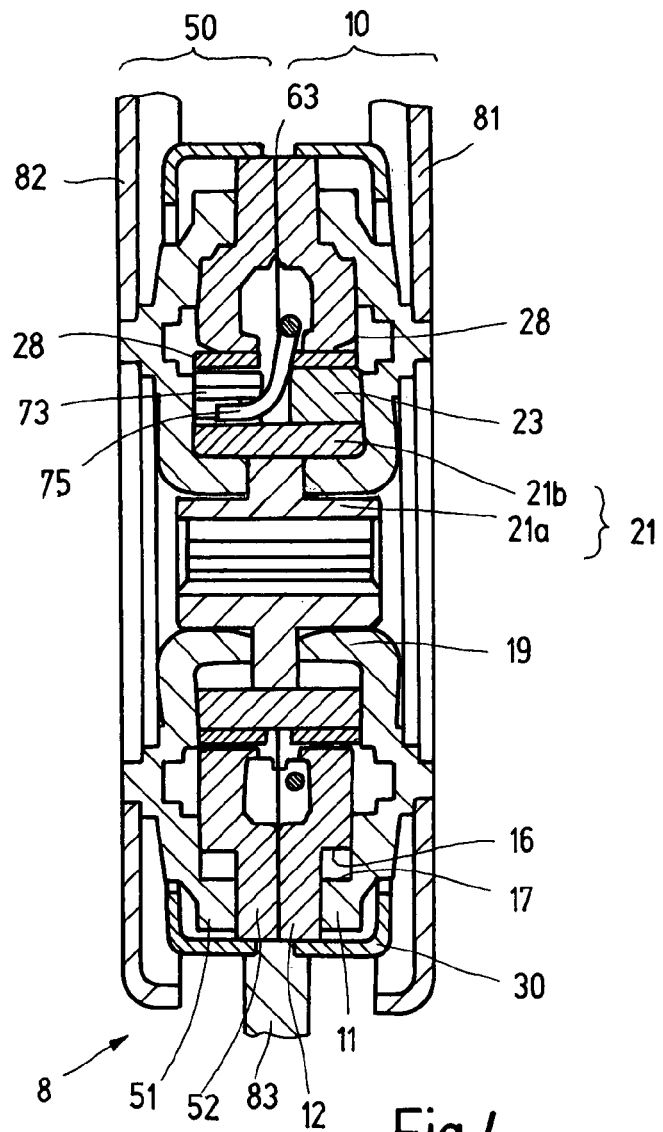
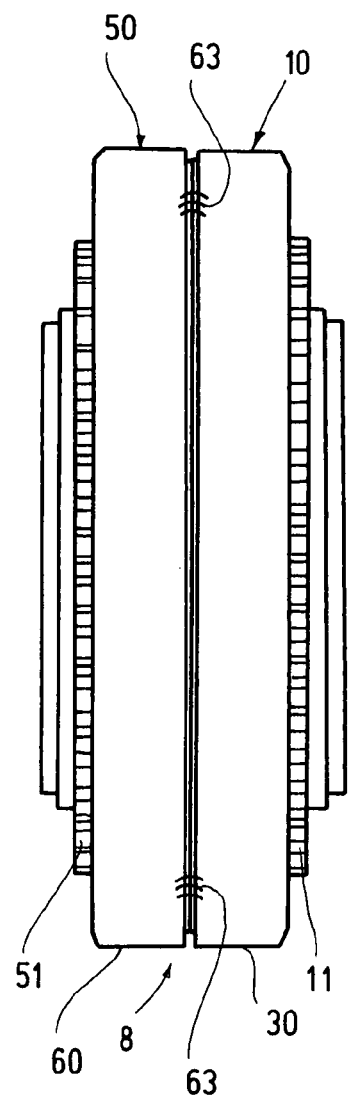
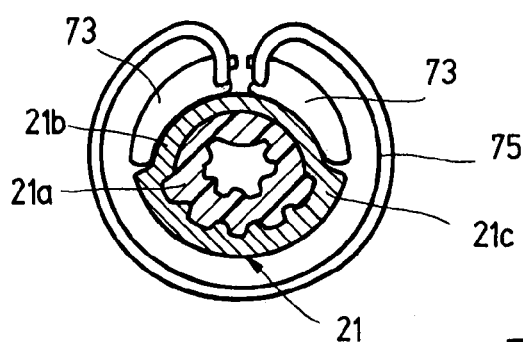
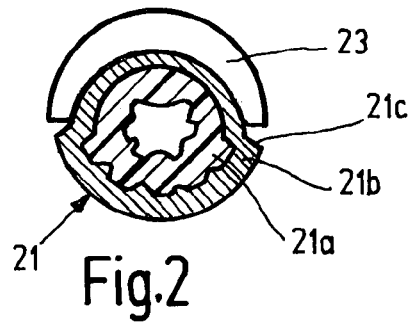
Fig.4
Fig.5
Fig.3
Fig.2

FITTING FOR A VEHICLE SEAT

CROSS-REFERENCE TO RELATED APPLICATION

The present application is a continuation of International Application PCT/EP2007/001485, which was filed Feb. 21, 2007. The entire disclosure of International Application PCT/EP2007/001485, which was filed Feb. 21, 2007, is incorporated herein by reference.

TECHNICAL FIELD

The present invention relates to a fitting for a vehicle seat, in particular a fitting for a motor vehicle seat, with the fitting having two individual fittings that are arranged axially next to each other and in parallel with respect to the flow of force, each of the two individual fittings having at least two fitting parts that can be rotated relative to each other and are mechanically interlinked by way of an eccentric epicyclic gear defining backlash, and the first individual fitting having an eccentric that is not able to eliminate the backlash.

BACKGROUND OF THE INVENTION

DE 35 29 887 C2 discloses a fitting of the type mentioned above, in the Technical Field section of this disclosure. For a vehicle seat with an integral seat belt, the fitting of DE 35 29 887 C2 is provided on the side of the seat that includes the connecting point of the seat belt. Although such a fitting can reliably transmit the forces in the event of a crash, it is capable of improvement in normal operation with respect to freedom from backlash, efficiency and construction space.

BRIEF SUMMARY OF SOME ASPECTS OF THE INVENTION

An aspect of the present invention is the provision of improvements for a fitting of the type mentioned above, in the Technical Field section of this disclosure. In accordance with one aspect of the present invention, a fitting (e.g., a composite fitting) for a vehicle seat, in particular for a motor vehicle seat, has two individual fittings that are arranged axially next to each other and in parallel with respect to the flow of force, with each of the two individual fittings having at least two fitting parts that can be rotated relative to each other and are mechanically interlinked by way of an eccentric epicyclic gear defining backlash, the first individual fitting having an eccentric that is not able to eliminate the backlash, and the second individual fitting having an eccentric adapted for eliminating the backlash.

Because the first individual fitting has an eccentric that is not able to eliminate the backlash and the second individual fitting has an eccentric adapted for eliminating the backlash, the first individual fitting can be optimized with respect to efficiency during the adjustment of the fitting and with respect to production costs, and the second individual fitting can be optimized with respect to the freedom from backlash upon fixing of the fitting, which is not possible in the case of an individual fitting on its own or is not possible simultaneously in the case of two identical fittings.

Apart from the eccentrics, identical parts and/or common components are preferably provided, for example a common driver which is constructed to be of an appropriate length axially in order to be able to be mounted on both sides. A multi-part driver comprising a driving bushing and driving ring can be produced from different materials, which is of advantage for a motorized drive.

In the case of a preferred disk form of the fitting parts, the fitting can be provided in a simple manner as a preassembled unit, with, preferably, a transport securing means (produced, for example, by laser welding) ensuring a first connection of the individual fittings, which connection is then secured by the fitting of the adaptors, with it being possible for the adaptor geometry, which is matched to the disk form, to be designed very simply.

The fitting according to the invention is preferably used for adjusting the inclination of the backrest, for example in the case of an individual seat, in particular a seat with an integral seat belt, or in the case of a rear seat system with a divided backrest (40%/60%) in the second or third row of seats, but can also be used elsewhere as a drive in the vehicle seat, for example for a height adjuster or inclination adjuster of the seat cushion.

Other aspects and advantages of the present invention will become apparent from the following.

BRIEF DESCRIPTION OF THE DRAWINGS

The invention is explained in more detail below with reference to an exemplary embodiment which is illustrated in the drawings, in which:

FIG. 2 shows a section through the eccentric of the first individual fitting, with the section taken perpendicular to the axial direction, FIG. 3 shows a section through the eccentric of the second individual fitting, with the section taken perpendicular to the axial direction, FIG. 4 shows a section through the fitting in the axial direction, FIG. 5 shows a side view of the fitting.

DETAILED DESCRIPTION OF EXEMPLARY EMBODIMENT

Figure 1:
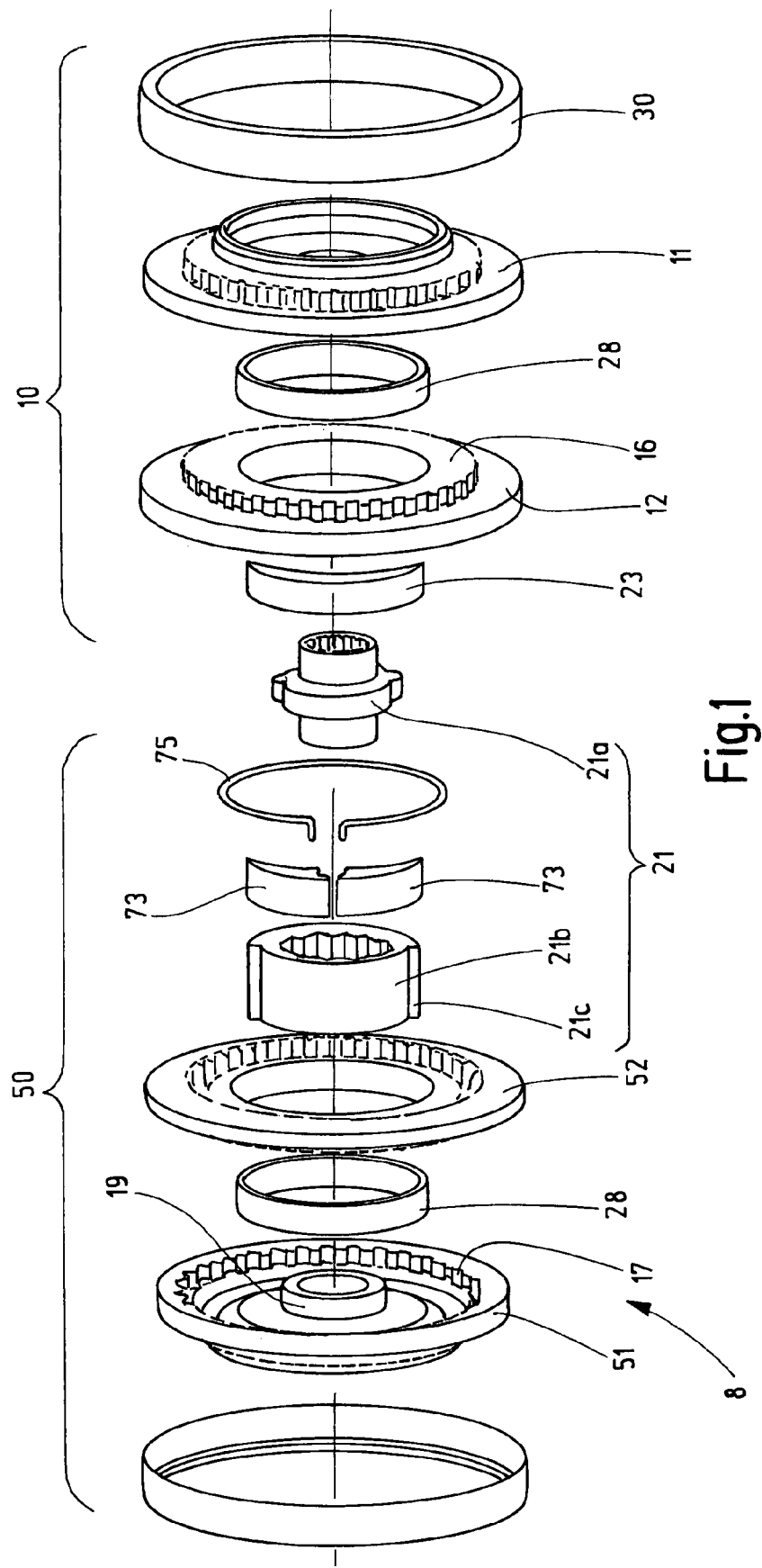
FIG. 1 shows an exploded illustration of the fitting of the exemplary embodiment without an adaptor.
Figure 6:
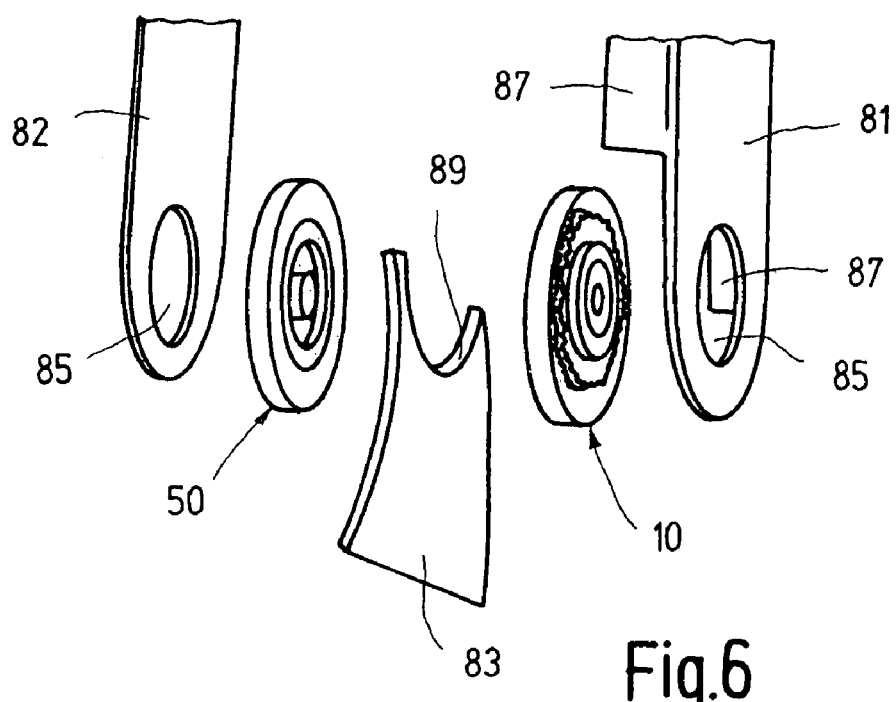
FIG. 6 shows an exploded illustration of the fitting with assembled individual fittings, without a transport securing means, and with an adaptor.
Figure 7:
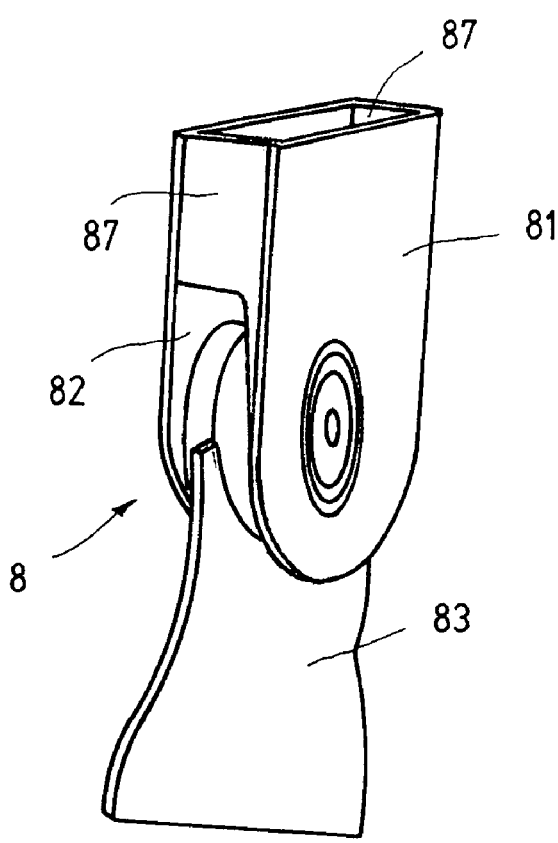
FIG. 7 shows a perspective view of the fitting together with an adaptor.
Figure 8:
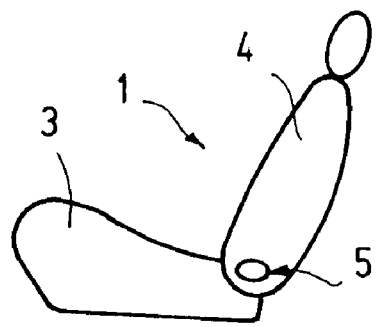
FIG. 8 shows a schematized vehicle seat.

A vehicle seat 1 of a motor vehicle has a seat part 3 and a backrest 4. The backrest 4 is fitted by way of a fitting arrangement 5 to the seat part 3 and can be adjusted in its inclination relative thereto. The arrangement of the backrest pivot axis defines the cylindrical coordinate system used below as the axial direction. The vehicle seat 1 is designed as a seat with an integral seat belt, i.e. the upper connecting point of the seat belt is located on the backrest 4, and, in the event of a crash, forces are also dissipated into the vehicle structure via the backrest 4, the fitting arrangement 5 and the seat part 3. While the fitting arrangement 5 on the side of the vehicle seat which faces away from the connecting point of the seat belt has a conventional individual fitting, as is used in the case of vehicles with a connection of the seat belt to the B pillar, a fitting 8 which is of reinforced design, in the manner described below, is provided on the side of the vehicle seat with the connecting point of the seat belt.

The fitting 8 is designed as a double fitting (e.g., a composite fitting), i.e. it comprises two unidentical individual fittings which are basically fully functional per se, and which are arranged axially next to each other and parallel in relation to the flow of force. This approximately doubles the maximum load-bearing capacity in the event of a crash.

The first individual fitting 10 of the fitting 8 has good efficiency for the adjustment of the inclination of the backrest 4 and serves primarily to adjust the fitting 8. The first individual fitting 10 has a first upper fitting part 11 and a first lower fitting part 12. For adjustment, the first upper and lower fitting parts 11, 12 are mechanically interlinked by way of a gear designed as an eccentric epicyclic gear (that is not free from backlash in the exemplary embodiment). The two first fitting parts 11 and 12 have an essentially (e.g., generally or substantially) flat disk form. To form the gear, a toothed wheel 16 with an external toothing is impressed on the first lower fitting part 12 and a toothed ring 17 with an internal toothing is impressed on the first upper fitting part 11, and the toothed wheel and toothed ring mesh with one another. The diameter of the addendum circle of the external toothing of the toothed wheel 16 is smaller by at least one tooth height than the diameter of the dedendum circle of the internal toothing of the toothed ring 17. The corresponding difference in the number of teeth of toothed wheel 16 and toothed ring 17 permits a rolling movement of the toothed ring 17 relative to the toothed wheel 16.

On the side facing the toothed wheel 16, the first upper fitting part 11 has an integrally formed collar formation 19 concentric to the internal toothing of the toothed ring 17. A driver 21 is provided in accordance with WO 03/024740 A1, the entire disclosure of which is expressly incorporated herein by reference. The driver 21, which is constructed in two parts, comprises a driving bushing 21a and a driving ring 21b. The driving bushing 21a projects with a gap into the collar formation 19. The driving bushing 21a has, in its center, an internal profile for receiving a profiled drive shaft 22. The driving ring 21b is connected in a rotationally fixed manner to the driving bushing 21a and is arranged outside the collar formation 19. The driving ring 21b together with a crescent-shaped element, referred to below as sickle element 23 for short, defines an eccentric. In this case, the sickle element 23 is held with a degree of backlash in the circumferential direction by a driving segment 21c of the driving ring 21b. Driven by a rotation of the drive shaft (and therefore of the driver 21), the eccentric (which is defined by the driving ring 21b and sickle element 23) revolves in a sliding bearing bushing 28 of the second adjustment fitting part 12 and thereby brings about the relative rolling movement of toothed ring 17 and toothed wheel 16. The movement is represented in the form of a relative rotational movement of the first upper fitting part 11 and first lower fitting part 12 with a superimposed wobbling movement. In the region of maximum eccentricity, the driving ring 21b is supported on the collar formation 19. High efficiency is achieved in that the first individual fitting 10 runs in a manner affected by backlash, or put more precisely, with a toothing backlash, and has an optimum supporting point for low bearing forces.

A first clasping ring, which is referred to as the first fitting ring 30 below, is provided to axially hold together the first individual fitting 10. Firstly, the first fitting ring 30 is arranged along the outer circumference of the first lower fitting part 12 and is connected thereto, for example is pressed on and, if appropriate, laser-welded. Secondly, the first fitting ring 30 engages over the first upper fitting part 11.

While the driving bushing 21a is preferably manufactured from plastic, the other components of the first individual fitting 10 are preferably composed of metal, for example steel, if appropriate sintered, hardened or treated in some other way. As an alternative to the construction described, the driving ring 21b and the sickle element 23 can be formed integrally with each other as fixed eccentric. It is also possible for the entire driver 21 to be of single-part design, or for the driver 21 and the sickle element 23 to be replaced by a single-part fixed eccentric.

The fitting 8 has a second individual fitting 50 which serves in particular to fix the fitting 8 in a manner free from backlash in the non-driven rest state, since the first individual fitting 10 is not suitable for zero backlash. The second individual fitting 50 is provided with a second upper fitting part 51 and a second lower fitting part 52. The second upper and lower fitting parts 51, 52 are mechanically interlinked by way of a self-locking eccentric epicyclic gear and are designed as a geared fitting which is identical to the first individual fitting 10—except for the eccentric. The first upper fitting part 11 and the second upper fitting part 51, firstly, and the first lower fitting part 12 and the second lower fitting part 52, secondly, and also the sliding bearing bushings 28, are therefore identical parts, as are the second fitting ring 60 and the first fitting ring 30.

The driver 21, i.e. both the driving bushing 21a and the driving ring 21b, is constructed in the exemplary embodiment to be of such a length in the axial direction that the driver 21 extends into both the first individual fitting 10 and the second individual fitting 50, and the driver 21 is mounted on both sides. As an alternative, the entire driver 21 or only the driving bushing 21a or only the driving ring 21b are divided in two in the axial direction, with a rotationally fixed coupling of the two axially separated parts of the driving bushing 21a taking place by way of the drive shaft.

Depending on requirements, in particular on the construction space available and on the type of drive, the first individual fitting 10 and the second individual fitting 50 are oriented specifically with respect to each other. The "inner fitting parts", for example the first lower fitting part 12 and the second lower fitting part 52, face each other and are connected to each other, for example by way of individual welding points, in particular laser welding points, as transport securing means 63. In contrast, the "outer fitting parts", i.e., in the exemplary embodiment, the first upper fitting part 11 and the second upper fitting part 51, face away from each other. The orientation of the two individual fittings may also be precisely reversed.

According to DE 44 36 101 A1 or DE 199 38 666 A1, the entire disclosures of which are expressly incorporated herein by reference, the driver 21, or, put more precisely, the driving ring 21b, and two curved wedge segments 73 form the eccentric of the second individual fitting 50. For the eccentric of the second individual fitting 50, the driving segment 21c engages with backlash between the two narrow ends of the two wedge segments 73, while the mutually facing wide ends of the wedge segment 73 are pressed apart by a spring which is bent annularly and has angled end fingers, with this spring being referred to as omega spring 75 for short. As a result, the second individual fitting 50 is free from backlash in the non-driven rest state. The self-locking caused by the geometric and frictional conditions ensures a sufficient locking moment of the second individual fitting 50.

In order to connect the fitting 8 to the seat part 3, on the one hand, and the backrest 4, on the other hand, a first outer adaptor 81, a second outer adaptor 82 and an inner adaptor 83 are provided. The two outer adaptors 81 and 82 both have, perpendicularly to the axial direction, a planar basic shape with a respective bearing eye 85 from which connecting tabs 87 on the edge can protrude axially. In the exemplary embodiment, two connecting tabs 87 protrude from the first outer adaptor 81, and the second outer adaptor 82 does not include protruding connecting tabs. The two outer adaptors 81 and 82 are to be connected to each other by way of the connecting tabs 87 with a hollow box being formed. The inner adaptor 83 has a fork 89 with a semicircular receptacle. For special high-load situations, the inner adaptor 83 can be extended radially beyond the center of the fitting 8 and, instead of the fork 88, can have a further bearing eye surrounded annularly by material.

In order to fit the adaptors 81, 82 and 83, the fitting 8 is received by the fork 89 of the inner adaptor 83 and then the inner adaptor 83 is fixedly connected to (preferably is welded to) the "inner fitting parts", in the exemplary embodiment the lower fitting parts 12 and 52. The "outer fitting parts", in the exemplary embodiment the upper fitting parts 11 and 51, are then engaged over by the outer adaptors 81 and 82, with, preferably, a respective offset of the "outer fitting parts" 11, 51 coming to lie in a respective bearing eye 85. Finally, the outer adaptors 81 and 82 are directly and fixedly connected to the respective "outer fitting parts" 11, 51 and to each other by way of the connecting tabs 87. The assignment to seat part 3 and backrest 4 depends on the application. The connecting tabs 87 are arranged at such a distance from the backrest pivot axis that the inner adaptor 83 can reach between the outer adaptors 81 and 82 when the backrest 4 is pivoted forward.

An arrangement of first individual fitting 10 and second individual fitting 50, in which the first fitting ring 30 and the second fitting ring 60 are connected to the respective "inner fitting parts" 12, 52, i.e. can be jointly connected to the fork 89 (or the bearing eye) of the inner adaptor 83, is particularly preferable because of the fixed and therefore good connection option.

A handwheel or an electric motor can be arranged on the outside of the fitting 8 and drives the drive shaft, which engages in the driver 21, and therefore the two individual fittings 10 and 50 can be operated synchronously either manually or by motor. The electric motor can also be arranged within one or both eccentrics.

It will be understood by those skilled in the art that while the present invention has been discussed above with reference to an exemplary embodiment, various additions, modifications and changes can be made thereto without departing from the spirit and scope of the invention as set forth in the claims.

That which is claimed:

1. A composite fitting for a vehicle seat, the composite fitting comprising:
    a first individual fitting; and
    a second individual fitting, wherein
    the first and second individual fittings are arranged axially next to each other and in parallel with respect to forces passing through the composite fitting,
    for each of the first and second individual fittings, the individual fitting includes at least two fitting parts that can be rotated in a circumferential direction relative to each other and are mechanically interlinked with one another by way of an eccentric epicyclic gear with backlash in both a radial direction and the circumferential direction between teeth of inner and outer toothed portions of the eccentric epicyclic gear;
    the first individual fitting includes an eccentric that is not able to eliminate the backlash; and
    the second individual fitting includes an eccentric adapted for eliminating the backlash.

2. The composite fitting as claimed in claim 1, wherein the eccentric of the first individual fitting comprises a sickle element, a driver, or a combination thereof.

3. The composite fitting as claimed in claim 2, wherein the driver comprises a driving ring that is part of the eccentric of the first individual fitting.

4. The composite fitting as claimed in claim 2, wherein the eccentric of the first individual fitting includes both the sickle element and the driver.

5. The composite fitting as claimed in claim 2, wherein the eccentric of the second individual fitting comprises two wedge segments, a driver, or a combination thereof.

6. The composite fitting as claimed in claim 1, wherein the eccentric of the second individual fitting comprises wedge segments, a driver, or any combination thereof.

7. The composite fitting as claimed in claim 6, wherein the eccentric of the second individual fitting comprises the wedge segments, and the wedge segments are mounted in a configuration selected from the group consisting of:
    a configuration in which the wedge segments are radially between the at least two fitting parts of the second individual fitting, and the wedge segments are directly radially adjacent to a fitting part of the at least two fitting parts of the second individual fitting, and
    a configuration in which the wedge segments are radially between the at least two fitting parts of the second individual fitting, and the wedge segments are directly radially adjacent to a bushing that is fixedly connected to a fitting part of the at least two fitting parts of the second individual fitting.

8. The composite fitting as claimed in claim 7, wherein:
    the eccentric of the second individual fitting also comprises the driver;
    the driver includes a driving bushing and a driving ring;
    the driving ring is connected to the driving bushing in a rotationally fixed manner; and
    the driving ring is mounted in at least one individual fitting selected from the group consisting of the first individual fitting and the second individual fitting.

9. The composite fitting as claimed in claim 7, comprising at least one spring for urging the wedge segments away from one another.

10. The composite fitting as claimed in claim 6, wherein the driver comprises a driving ring that is part of the eccentric of the second individual fitting.

11. The composite fitting as claimed in claim 1, comprising at least one driver for driving the composite fitting.

12. The composite fitting as claimed in claim 11, wherein:
    the at least one driver is a common driver; and
    the common driver is sufficiently long in the axial direction so that the common driver extends into both the first individual fitting and the second individual fitting.

13. The composite fitting as claimed in claim 12, wherein the common driver is mounted in both the first individual fitting and the second individual fitting.

14. The composite fitting as claimed in claim 1, wherein:
    the fitting parts of the first individual fitting are each at least approximately in disk form;
    the first individual fitting includes a ring axially holding together the fitting parts of the first individual fitting;
    the fitting parts of the second individual fitting are each at least approximately in disk form; and
    the second individual fitting includes a ring axially holding together the fitting parts of the second individual fitting.

15. The composite fitting as claimed in claim 1, comprising a transport securing means that connects the first and second individual fittings directly to each other.

16. The composite fitting as claimed in claim 1, wherein:
for each of the first and second individual fittings, the fitting parts of the individual fitting include, with respect to the axial arrangement, an outer fitting part and an inner fitting part; and
at least one of the fitting parts of the first individual fitting is fixedly connected to at least one of the fitting parts of the second individual fitting.

17. The composite fitting as claimed in claim 16, wherein:
the at least one of the fitting parts of the first individual fitting is the outer fitting part of the first individual fitting;
the at least one of the fitting parts of the second individual fitting is the outer fitting part of the second individual fitting; and
the outer fitting parts are fixedly connected to each other by way of one or more outer adaptors.

18. The composite fitting as claimed in claim 17, wherein:
the one or more outer adaptors includes a first outer adapter and a second outer adapter that is connected to the first outer adapter;
each of the first and second outer adapters includes a bearing eye;
the bearing eye of the first outer adapter is in receipt of the outer fitting part of the first individual fitting; and
the bearing eye of the second outer adapter is in receipt of the outer fitting part of the second individual fitting.

19. The composite fitting as claimed in claim 16, wherein:
the at least one of the fitting parts of the first individual fitting is the inner fitting part of the first individual fitting;
the at least one of the fitting parts of the second individual fitting is the inner fitting part of the second individual fitting; and
the inner fitting parts are fixedly connected to each other by way of an inner adaptor.

20. The composite fitting as claimed in claim 19, wherein the inner adaptor includes a receptacle that is in receipt of the inner fitting parts.

21. The composite fitting as claimed in claim 20, wherein the receptacle of the inner adaptor is a fork.

22. The composite fitting as claimed in claim 16, wherein:
the at least one of the fitting parts of the first individual fitting is the inner fitting part of the first individual fitting;
the at least one of the fitting parts of the second individual fitting is the inner fitting part of the second individual fitting; and
the inner fitting parts are fixedly connected to each other in a direct manner.

23. The composite fitting as claimed in claim 1 in combination with the vehicle seat, wherein:
the vehicle seat includes a seat part and at least one backrest; and
inclination of the backrest is adjustable at least by way of the composite fitting.

24. The composite fitting as claimed in claim 1, wherein:
the eccentric of the second individual fitting comprises two wedge segments and a spring for forcing the two wedge segments apart from one another; and
the eccentric of the first individual fitting consists essentially of a sickle element and a driving ring.

25. A composite fitting for a vehicle seat, the composite fitting comprising:
a first individual fitting; and
a second individual fitting, wherein
the first and second individual fittings are arranged axially next to each other and in parallel with respect to forces passing through the composite fitting,
for each of the first and second individual fittings, the individual fitting includes at least two fitting parts that can be rotated in a circumferential direction relative to each other and are mechanically interlinked with one another by way of an eccentric epicyclic gear with backlash in both a radial direction and the circumferential direction between teeth of inner and outer toothed portions of the eccentric epicyclic gear;
at least one of the fitting parts of the first individual fitting is fixedly connected to at least one of the fitting parts of the second individual fitting;
the first individual fitting includes an eccentric that is not able to eliminate the backlash, with the eccentric of the first individual fitting comprising a driving ring; and
the second individual fitting includes an eccentric adapted for eliminating the backlash, with the eccentric of the second individual fitting including wedge segments and the driving ring.

26. The composite fitting as claimed in claim 25, wherein:
the eccentric of the first individual fitting includes a crescent-shaped element;
the driving ring includes a driving segment for engaging both
(a) the crescent-shaped element of the eccentric of the first individual fitting, and
(b) the wedge segments of the eccentric of the second individual fitting.

* * * * *

UNITED STATES PATENT AND TRADEMARK OFFICE
CERTIFICATE OF CORRECTION

PATENT NO. : 7,753,450 B2  Page 1 of 1
APPLICATION NO. : 12/150483
DATED : July 13, 2010
INVENTOR(S) : Dietmar Eppert et al.

It is certified that error appears in the above-identified patent and that said Letters Patent is hereby corrected as shown below:

On the title page, item [75]

In the Assignee address:

Change "Kaiserlautern" to --Kaiserslautern--.

In the References Cited:

Add U.S. Patent 6,648,413 B2   11/2003   Uramichi

Signed and Sealed this

Twenty-third Day of November, 2010

David J. Kappos
*Director of the United States Patent and Trademark Office*